United States Patent [19]

Nishimura et al.

[11] Patent Number: 4,676,444

[45] Date of Patent: Jun. 30, 1987

[54] WEBBING DRIVING APPARATUS

[75] Inventors: Yuji Nishimura; Takashi Kawaharazaki, both of Aichi, Japan

[73] Assignee: Kabushiki Kaisha Tokai-Rika-Denki-Seisakusho, Aichi, Japan

[21] Appl. No.: 844,935

[22] Filed: Mar. 27, 1986

[30] Foreign Application Priority Data

Mar. 29, 1986 [JP] Japan .................................. 60-46255

[51] Int. Cl.⁴ .......................................... B65H 75/44
[52] U.S. Cl. .................................. 242/54 R; 242/158.2
[58] Field of Search ................ 242/54 R, 54 A, 158.2, 242/25 R, 117, 125

[56] References Cited

U.S. PATENT DOCUMENTS

| | | |
|---|---|---|
| 3,016,206 | 1/1962 | Cone .................................. 242/54 A |
| 3,129,715 | 4/1964 | Militano et al. ............. 242/158.2 X |
| 3,728,906 | 4/1973 | Takaki et al. ................ 242/54 A X |
| 3,961,589 | 6/1976 | Lombardi ...................... 242/54 A X |
| 4,181,268 | 1/1980 | Carolus et al. .................... 242/54 A |
| 4,236,162 | 11/1980 | Carolus et al. ............. 242/54 A X |
| 4,436,250 | 3/1984 | Becker ............................ 242/54 R |

Primary Examiner—Stuart S. Levy
Assistant Examiner—David Werner
Attorney, Agent, or Firm—Sixbey, Friedman & Leedom

[57] ABSTRACT

An apparatus for driving a wire for actuating a webbing of an automatic seatbelt system includes a guide member and guide means. The guide member is prevented from rotating relative to a rotary drum on which the wire is wound, but allowed to move in the axial direction of the drum. One end of the wire is retained by the guide member, and this guide member is moved in response to the rotation of the rotary drum by the action of the guide means. Accordingly, the wire is tightly or closely wound on the rotary drum at all times.

20 Claims, 6 Drawing Figures

PRIOR ART

PRIOR ART

WEBBING DRIVING APPARATUS

BACKGROUND OF THE INVENTION

1. Field of the Invention

The present invention relates to a webbing driving apparatus for use in a seatbelt system for a vehicle which is so designed that the distal end protion of an occupant restraining webbing is guided by a guide rail mounted on the body of the vehicle, thereby allowing the webbing to be automatically fastened to and unfastened from the occupant's body.

2. Description of the Related Art

There is one type of seatbelt system, known as "automatic seatbelt system", in which, when an occupant restraining webbing is driven, it is guided by a guide rail mounted on the vehicle body so as to be automatically fastened to and unfastened from the occupant's body. One type of apparatus for driving the webbing in such an automatic seatbelt system is arranged such that one end of a line means such as a wire is connected to the webbing, while the other end of the line means is connected to a drum, and the webbing is driven by winding up the line means onto the drum or unwinding the former from the latter, as shown in the specification of Japanese Patent Laid-Open Publication No. 7926/1974 (German Application No. P2216709.5).

This type of webbing driving apparatus suffers, however, from the disadvantage that, when the line means is not regularly wound up onto the drum, it may be impossible to wind up a predetermined amount or length of the line means. In order to cope with this problem, a structure for webbing driving apparatus such as that shown in FIGS. 5 and 6 may be adopted. Namely, the outer peripheral surface of an inner drum 10 is tapered, and a tapered groove is formed inside an outer drum 12, thereby defining a guide groove 16 between the inner and outer drums 10 and 12 for guiding the line means 14 toward the drum shaft.

In this structure, however, when no tension acts on the line means 14 when unwound, the portion of the line means 14 which is wound on the inner drum 10 may be loosened and thereby disordered. In such a case, variations are produced in the density of turns of the line means 14 wound on the inner drum 10. In a low density portion, a gap is produced between each pair of adjacent turns of the line means 14, so that, when the line means 14 is driven, the adjacent turns of the line means 14 may collide with each other across this gap and generate a noise.

SUMMARY OF THE INVENTION

In view of the above-described circumstances, it is a primary object of the present invention to provide a webbing driving apparatus which enables a line means to be smoothly wound up onto and unwound from the drum.

To this end, the present invention provides a webbing driving apparatus for use in a seatbelt system so designed that a part of an occupant restraining webbing is driven by the force derived from movement of a line means, thereby enabling the webbing to be automatically fastened to the body of an occupant, the apparatus comprising: a rotary drum for winding up the line means thereon; a guide member rotatable together with the rotary drum and movable in the axial direction of the rotary drum, the guide member being adapted to retain one end of the line means and guide the line means so as to be wound on the outer periphery of the rotary drum; and guide means for moving the guide member in the axial direction of the rotary drum in accordance with the amount by which the line means is wound on the drum.

In the webbing driving apparatus having the above-described arrangement, the webbing is driven in response to the movement of the line means when wound and unwound so that the line means is automatically fastened to and unfastened from the occupant's body. The guide member is moved by the guide means in the axial direction of the rotary drum, so that the line means is guided by the guide member so as to move in the axial direction of the drum, and while doing so and further moving in the longitudinal direction thereof, the line means is wound up onto or unwound from the rotary drum. The line means is wound up onto and unwound from the drum at the same position at all times.

DESCRIPTION OF THE PREFERRED EMBODIMENT

The present invention will be described hereinunder in detail with reference to the accompanying drawings.

FIGS. 1 to 4 show in combination one embodiment of the webbing driving apparatus according to the present invention.

Figure 2:
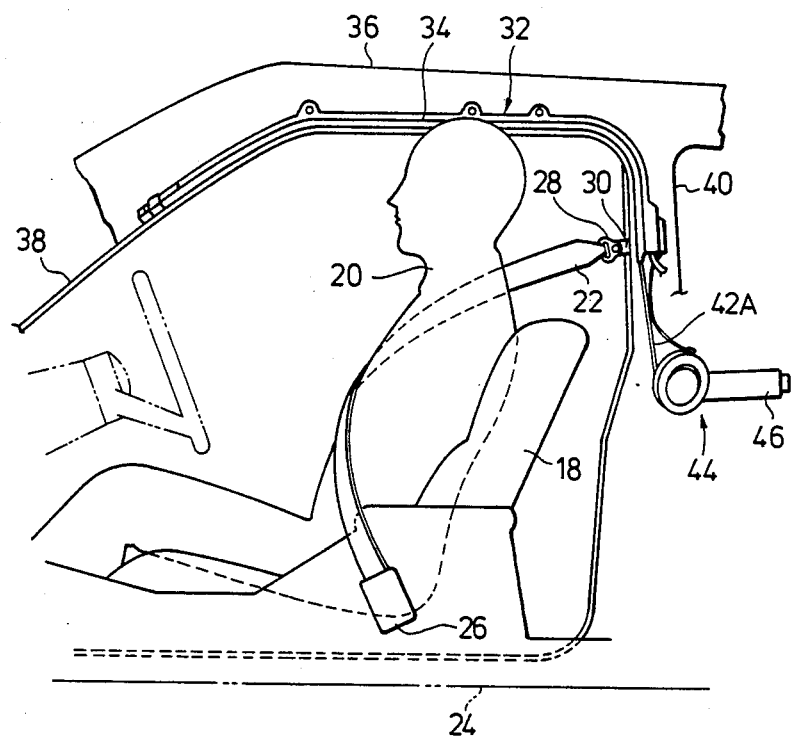
FIG. 2 schematically shows a seatbelt system to which the embodiment of the present invention is applied.

Referring first to FIG. 2 which schematically shows a seatbelt system to which one embodiment of the present invention is applied, the system is arranged such that an occupant 20 seated in a seat 18 can automatically fasten a webbing 22. One end portion of the webbing 22 is wound up into a retractor 26 by a predetermined biasing force, the retractor 26 being mounted on a floor member 24 in the substantially central portion of the vehicle body. The retractor 26 incorporates an inertia type lock mechanism which is adapted to instantaneously stop the webbing 22 from being unwound when an emergency situation of the vehicle occurs.

The other end of the webbing 22 is retained by an anchor plate 30 through a connecting member 28. The anchor plate 30 is adapted to be moved in the longitudinal direction of the vehicle while being guided by a guide rail 32. The guide rail 32 is constitutedby a guide rail body 34. The central portion of the guide rail body 34 is horizontally disposed and secured to a roof side member 36 which constitutes a part of one side wall of the vehicle body. The forward end portion of the guide rail body 34 is slanted along a front pillar 38 and secured thereto. The rearward end portion of the guide rail body 34 is bent at substantially right angles so as to extend downward, and secured to a center pillar 40.

The guide rail body 34 is provided with a wire accommodating groove (not shown). A wire 42 which serves as a line means is tightly accommodated in this groove in such a manner that the wire 42 extends in the longitudinal direction of the guide rail 32 and is slidably guided.

One end portion of the wire 42 is retained by the anchor plate 30. The anchor plate 30 is adapted to move together with the wire 42. The other end portion of the wire 42 is connected to a webbing driving apparatus 44 according to the present invention which is mounted on the lower end portion of the center pillar 40. The wire 42 is tightly covered with a cover 43 which is connected at one end thereof to the guide rail 32 and at the other end to the webbing driving apparatus 44.

The webbing driving apparatus 44 is arranged such that the wire 42 is axially moved by the driving force derived from a motor 46, thereby applying either a compressive or pulling force to the wire 42, and thus moving the anchor plate 30 toward either the front or rear end of the vehicle.

Figure 1:
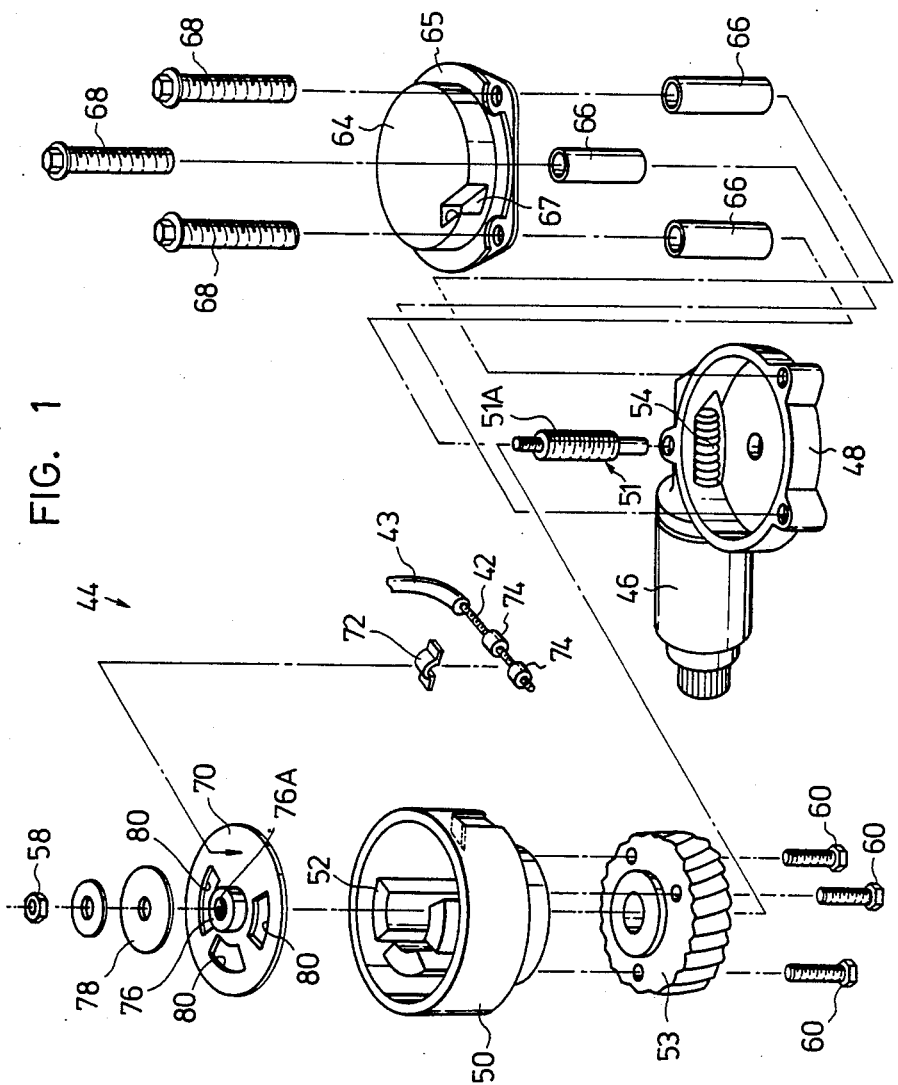
FIG. 1 is an exploded perspective view of one embodiment of the webbing driving apparatus according to the present invention.
Figure 3:
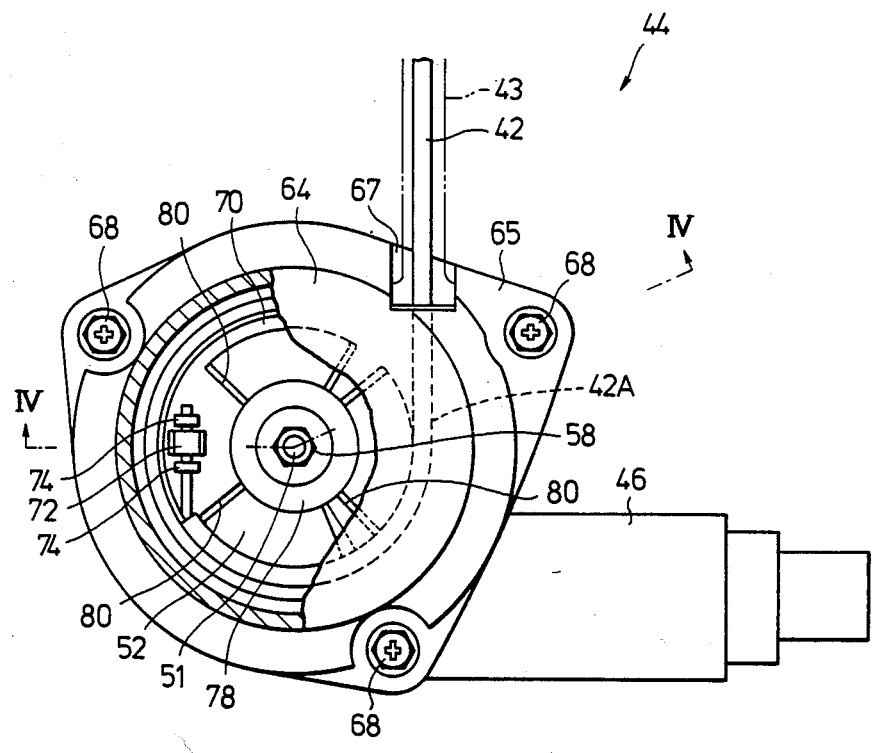
FIG. 3 is an enlarged view of an essential portion of the embodiment shown in FIG. 2.
Figure 4:
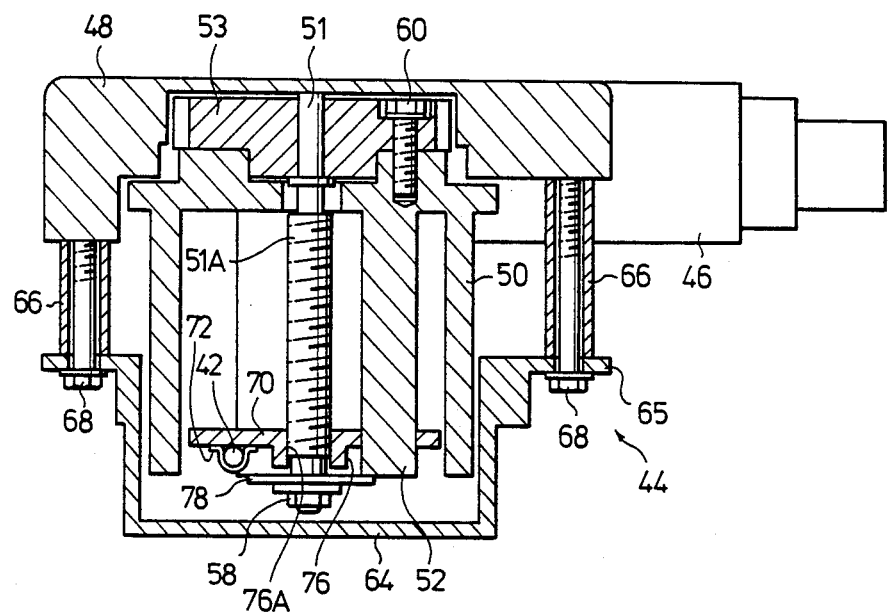
FIG. 4 is a sectional view taken along the line IV—IV in FIG. 3.
Figure 5:
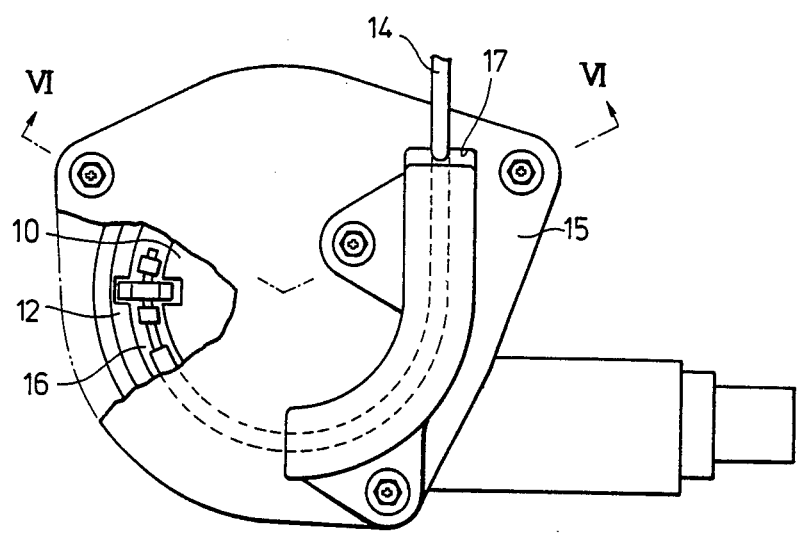
FIG. 5 schematically shows a conventional apparatus for winding and unwinding line means.
Figure 6:
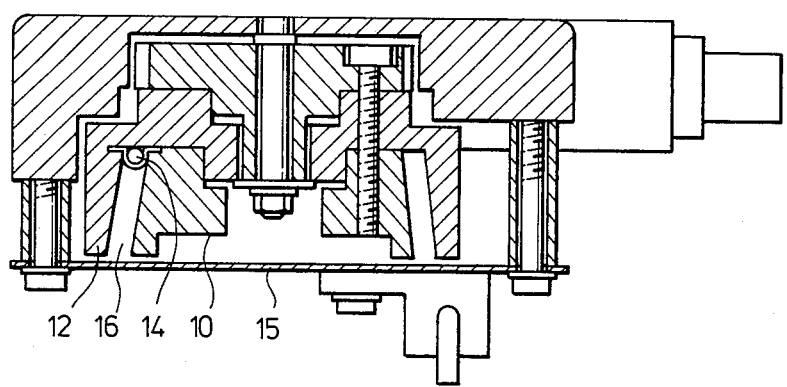
FIG. 6 is a sectional view taken along the line VI—VI in FIG. 5.

As shown in FIGS. 1, 3 and 4, the webbing driving apparatus 44 has an apparatus body 48, an outer drum 50 and an inner drum 52.

The body 48 has a cylindrical shape. One end of a shaft 51 is coaxially secured to the bottom of the body 48, and the other or distal end of the shaft 51 projects from the body 48. A worm wheel 53 is disposed inside the body 48 and rotatably supported on one end portion of the shaft 51. The worm wheel 53 is meshed with a worm 54 which is coaxailly mounted on the drive shaft of the motor 46 so that the driving force from the motor 46 is transmitted to the worm wheel 53. The outer drum 50 is coaxially secured to the upper side of the worm wheel 53.

The outer drum 50 has a cylindrical shape and is secured at the bottom thereof to the worm wheel 53 by means of bolts 60. The shaft 51 extends through the inside of the outer drum 50. The distal end portion of the shaft 51 projects from the outer drum 50 and is covered with a cover 64.

The cover 64 is disposed coaxially with respect to the outer drum 50. The cover 64 has a flange 65 which is formed at one end thereof which is closer to the outer drum 50. The cover 64 is secured at the flange 65 to the apparatus body 48 by means of bolts 68 through collars 66. Thus, the cover 64 is disposed above the outer drum 50 in such a manner as to cover the distal end portion of the outer drum 50. A wire guide portion 67 is formed on the flange 65, so that the wire 42 passes through the wire guide portion 67 to enter the inside of the cover 64.

In addition, a guide member 70 is accommodated inside the cover 64 and within the outer drum 50. The guide member 70 has a disk-like shape. A boss 76 is coaxially formed on the guide member 70 in such a manner as to project toward the cover 64. The boss 76 is provided with an internal thread 76A which constitutes a part of guide means.

The internal thread 76A is in engagement with an external thread 51A which is formed on the intermediate portion of the shaft 51 and which constitutes another part of the guide means. Thus, when rotated, the guide member 70 is movable until one axial end portion thereof abuts against either the bottom wall of the outer drum 50 or a disk 78 which is secured to the distal end portion of the shaft 51 by means of a bolt 58. In this case, when the guide member 70 is rotated one turn, it is axially moved a distance equal to the outer diameter of the wire 42. Three fan-shaped guide bores 80 which constitute still another part of the guide means are provided in the guide member 70 in such a manner that they are spaced around the boss 76, the inner peripheral surface of each guide bore 80 defining a circular arc which has the same axis as the guide member 70. The inner drum 52, which is formed integral with the outer drum 50 so as to project upward from the bottom of the outer drum 50, is fitted into the guide bores 80. Thus, the driving force from the motor 46 is transmitted to the guide member 70 through tne inner drum 52, and the guide member 70 is thereby rotated so as to wind up the wire 42.

One end of the wire 42 is retained through a holder 72 on the side of the guide member 70 which is closer to the cover 64, the holder 72 being disposed in the vicinity of the guide bores 80. More specifically, a pair of pieces 74 are secured to that end of the wire 42, and these pieces 74 are retained by the holder 72, thereby preventing the wire 42 from moving in the axial direction thereof. The wire 42 is wound up onto the inner drum 52 while being guided by the clearance between the inner wall of the outer drum 50 and the outer wall of the inner drum 52. The clearance between the inner wall of the outer drum 50 and the outer wall of the inner drum 52 is set such as to be slightly larger than tha outer diameter of the wire 42, thus preventing the wire 42 from being wound double on the inner drum 52. The gap between the inner wall of the outer drum 50 and the outer wall of the guide member 70 is made so small that there is no risk of the wire 42 entering the gap between the guide member 70 and the bottom wall of the outer drum 50.

The motor 46 is operated as follows. Namely, when the anchor plate 30 is positioned at the end of the guide rail body 34 on the side thereof which is closer to the front end of the vehicle, the motor 46 is activated when the occupant 20 closes the door after seating himself, whereas, when the anchor plate 30 is positioned at the other end of the guide rail body 34, the motor 46 is started when the occupant 20 opens the door 20. At this time, the motor 46 is operated so that the drive shaft thereof is rotated in the direction reverse to that in the case of the above. The operation of the motor 46 is suspended when the anchor plate 30 is brought into contact with either the forward or rearward end of the guide rail body 34.

The following is a description of the operation of this embodiment.

Before the occupant 20 enters the vehicle, the anchor plate 30 is positioned at the forward end of the guide rail body 34. In this state, the motor 46 is not activated. In the webbing driving apparatus 44, the guide member 70 is at rest at a position where the boss 76 almost comes in contact with the disk 78, as shown in FIG. 4. As to the wire 42, a portion thereof which extends between the wireguide portion 67 and the point 42A (see FIG. 3 ) at which the wire 42 comes into contact with the inner drum 52 is supported by the guide member 70 so that said portion extends in a tangential direction which is substantially perpendicular to the axial direction of the inner drum 52.

When the occupant 20 closes the door after seating himself in the seat 18, the motor 46 is activated. In consequence, the outer and inner drums 50 and 52 in the webbing driving apparatus 44 are rotated by the driving force of the motor 46 which is transmitted thereto through the worm 54 and the worm wheel 56. The guide member 70 is also rotated by the driving force applied thereto from the motor 46 through the inner drum 52. Thus, the wire 42 is passed through the wire guide portion 67 and wound up onto the inner drum 52 while being guided by both the inner wall of the outer drum 50 and the outer wall of the inner drum 52. At this time, the guide member 70 is moved, while being rotated, toward the bottom of the outer drum 50 in accordance with the amount by which the wire 42 is wound up on the inner drum 52.

Accordingly, the wire 42 is wound up onto the outer periphery of the innder drum 52 while being pulled at its distal end portion by the guide member 70. At this time, the wire 42 performs a spiral motition while sliding on the outer periphery of the inner drum 52. However, since the guide member 70 enables the spirally wound wire 42 to be maintained in a closely wound state at all times, the wire 42 is prevented from loosening, and it is also possible to prevent generation of any noise which would otherwise be produced when the wire 42 is loosely or irregularly wound. In other words, if the wire 42 is not closely or regularly wound, a gap is produced between each pair of adjacent turns of the wire 42, and when the wire 42 is driven, the adjacent turns of the wire 42 may collide with each other across this gap to generate a noise. In addition, the point 42A at which the wire 42 comes into contact with the inner drum 52 when it is wound up onto the drum 52 is maintained at a predetermined position at all times.

As the wire 42 is wound up onto the inner drum 52, the anchor plate 30, which is connected to the wire 42, is pulled by the wire 42, so that it is moved toward the rear end of the vehicle while being guided by the guide rail body 34, as shown in FIG. 2. Similarly, the end portion of the webbing 22 which is closer to the anchor plate 30 is moved together with the plate 30.

The anchor plate 30 is moved until it abuts against the rearward end of the guide rail body 34. When the movement of the anchor plate 30 is stopped, the operation of the motor 46 is also suspended. In consequence, the operation of the webbing driving apparatus 44 is suspended. In this state, the guide member 70 has been axially moved in accordance with the amount by which the wire 42 is wound on the inner drum 52, and is at rest at a position where it almost comes into contact with the bottom wall of the outer drum 50. Even in this state, the wire 42 is maintained in the closely wound condition by virtue of the guide member 70. As to the webbing 22, a portion thereof which extends between the connecting member 28 and the retractor 26 is fastened to the occupant's breast.

When, in this set of conditions, the occupant 20 opens the door, the motor 46 is activated. At this time, the drive shaft of the motor 46 is rotated in the direction reverse to that in the case of the above. In consequence, the webbing driving apparatus 44 is operated in an opposite manner to the above. More specifically, in response to the rotation of the inner drum 52, the wire 42 is unwound therefrom through the wire guide portion 67. At this time, the guide member 70 is moved toward the cover 64 in accordance with the amount by which the wire 42 is unwound from the drum 52, so that the wire 42 is maintained in the closely wound state. Since the contact point 42A of the wire 42 is maintained at a predetermined position at all times, the wire 42 is prevented from meandering, and there is no risk of the wound state of the wire 42 being disordered.

As the wire 42 is unwound from the inner drum 52, the anchor plate 30 connected to the wire 42 is pushed by the latter so as to be moved toward the front end of the vehicle along the guide rail body 34. At this time, the end portion of the webbing 22 which is closer to the anchor plate 30 is moved in a manner similar to that of the anchor plate 30.

The anchor plate 30 is moved until it abuts against the forward end of the guide rail body 34. When the movement of the anchor plate 30 is stopped, the operation of the motor 46 is suspended. In consequence, the operation of the webbing driving apparatus 44 is suspended, and the apparatus 44 returns to the state shown in FIG. 2. The webbing 22 is unfastened from the occupant's body and completely separated therefrom.

Thus, in this embodiment, when the wire 42 is wound up, the guide member 70 is moved in the axial direction of the inner drum 52 in accordance with the amount by which the wire 42 is wound up on the drum 52, whereby the wound portion of the wire 42 is maintained in a closely wound state. There is therefore no risk of adjacent turns of the wire 42 colliding with each other. In addition, the roll diameter of the wire 42 wound on the inner drum 52 is maintained at a constant value at all times, which enables the wire 42 to be wound up at a constant rate or speed.

When the wire 42 is unwound also, it is prevented from meandering, and there is no fear of the closely wound state of the wire 42 being disordered. Accordingly, there is no variation in the amount by which the wire 42 is unwound, so that it is possible to unwind the wire 42 at a constant rate at all times.

As has been described above, the webbing driving apparatus according to the present invention comprises: a rotary drum for winding up a line means thereon; a guide member rotatable together with the rotary drum and movable in the axial direction of the rotary drum, the guide member being adapted to retain one end of the line means and guide the line means so as to be wound on the outer periphery of the rotary drum; and guide means for moving the guide member in the axial direction of the rotary drum in accordance with the amount by which the line means is wound on the drum. It is therefore possible to smoothly wind and unwind the line means.

Although, in the above-described embodiment, wire is employed as a line means, the configuration of the line means is not necessarily limited to that of wire, and it is possible to employ line means having any kind of configuration, e.g., tape or the like.

What is claimed is:

1. A webbing driving apparatus for use in a seatbelt system so designed that a part of an occupant restraining webbing is driven by the force derived from movement of a line means, thereby enabling the webbing to be automatically fastened to the body of an occupant, said apparatus comprising:
   (a) a rotary drum for winding up said line means thereon;
   (b) a guide member rotatable together with said rotary drum and movable in the axial direction of said rotary drum, said guide member being adapted to retain one end of said line means and guide said line means so as to be wound on the outer periphery of said rotary drum; and
   (c) guide means for moving said guide member in the axial direction of said rotary drum in accordance with the amount by which said line means is wound on said drum, whereby said line means which is being wound up onto said rotary drum is fed in the axial direction of said drum and is thereby spirally wound on the outer periphery of said drum and in a closely wound state.

2. A webbing driving apparatus according to claim 1, wherein said guide means transmits the rotation of said rotary drum to said guide member through threaded engagement so that said guide member is moved.

3. A webbing driving apparatus according to claim 2, wherein said guide means applies force to said guide member so as to be moved through threaded engagement between said guide member and an externally-threaded member disposed such as to extend in the axial direction of said rotary drum.

4. A webbing driving apparatus according to claim 3, wherein, as said guide member is rotated one full turn, it is moved in the axial direction of said rotary drum by a distance equal to the diameter of said line means.

5. A webbing driving apparatus according to claim 3, wherein said rotary drum is rotatably supported such as to be coaxial with said externally-threaded member.

6. A webbing driving apparatus according to claim 1, wherein said rotary drum includes an inner drum on which said line means is spirally wound, and an outer drum disposed outside said inner drum across a space for accommodating the wound line means.

7. A webbing driving apparatus according to claim 6, wherein the dimension of said line means accommodating space, i.e., the distance between said inner and outer drums, is not greater than twice the diameter of said line means.

8. A webbing driving apparatus according to claim 7, wherein the size of said guide member is set such that it is able to enter the inside of said outer drum.

9. A webbing driving apparatus according to claim 8, wherein the gap between the outer periphery of said guide member and the inner periphery of said outer drum is set such as to be not greater than the diameter of said line means.

10. A webbing driving apparatus according to claim 8, wherein said guide member is provided with a through-hole through which said inner drum extends, whereby said guide member is prevented from rotating relative to said inner drum but allowed to move relative to said inner drum in the axial direction thereof alone.

11. A webbing driving apparatus employed in an automatic seatbelt system designed to automatically fasten a webbing to the body of an occupant, to wind up a line means for actuating said webbing, said apparatus comprising:
 (a) a main body secured to the body of a vehicle;
 (b) a rotary drum rotatably supported by said body and adapted to wind up said line means by winding it on the outer periphery thereof;
 (c) a motor mounted on said body for rotating said rotary drum;
 (d) a guide member rotatable together with said rotary drum and retaining one end of said line means; and
 (e) guide means for guiding said guide member in such a manner that said guide member is rotated together with said rotary drum, and while doing so, said guide member is moved in the axial direction of said rotary drum, thereby spirally winding said line means while sliding it on the outer periphery of said rotary drum, and thus closely winding said line means on said drum.

12. A webbing driving apparatus according to claim 11, wherein said guide means transmits the rotation of said rotary drum to said guide member through thread engagement so that said member is moved.

13. A webbing driving apparatus according to claim 12, wherein said guide means applies force to said guide member so as to be moved through threaded engagement between said guide member and an externally-threaded member disposed such as to extend in the axial direction of said rotary drum.

14. A webbing driving apparatus according to claim 13, wherein, as said guide member is rotated one full turn, it is moved in the axial direction of said rotary drum by a distance equal to the diameter of said line means.

15. A webbing driving apparatus according to claim 13, wherein said rotary drum is rotatably supported such as to be coaxial with said externally-threaded member.

16. A webbing driving apparatus according to claim 11, wherein said rotary drum includes an inner drum on which said line means is spirally wound, and an outer drum disposed outside said inner drum across a space for accommodating the wound line means.

17. A webbing driving apparatus according to claim 16, wherein the dimension of said line means accommodating space, i.e., the distance between said inner and outer drums, is not greater than twice the diameter of said line means.

18. A webbing driving apparatus according to claim 17, wherein the size of said guide member is set such that it is able to enter the inside of said outer drum.

19. A webbing driving apparatus according to claim 18, wherein the gap between the outer periphery of said guide member and the inner periphery of said outer drum is set such as to be not greater than the diameter of said line means.

20. An apparatus for winding up a wire for driving a webbing of an automatic seatbelt system, which comprises:
 (a) a main body secured to the body of a vehicle;
 (b) an inner drum rotatably supported by said body and adapted to wind said wire on the outer periphery thereof;
 (c) an outer drum disposed outside said inner drum so as to oppose the outer periphery of the wire wound on the outer periphery of said inner drum, said outer drum being rotatable together with said inner drum;
 (d) a motor for rotating said inner drum;
 (e) a bolt extending through said inner drum and rotatable relative to said inner drum; and
 (f) a guide member retaining one end of said wire and being in threaded engagement with said bolt, said guide member being prevented from rotating relative to said inner drum but allowed to move in the axial direction of said inner drum when rotated, whereby, when said wire is wound up, said guide member pulls the wire which is being spirally wound on said inner drum in the axial direction of said inner drum, whereas, when said wire is unwound, said guide member pushes it in the opposite direction to the above.

* * * * *